No. 861,347. PATENTED JULY 30, 1907.
A. C. ANDERSON.
ADJUSTABLE VEHICLE SEAT.
APPLICATION FILED AUG. 11, 1906.
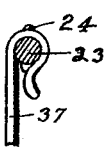
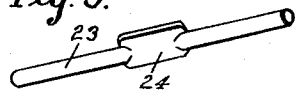
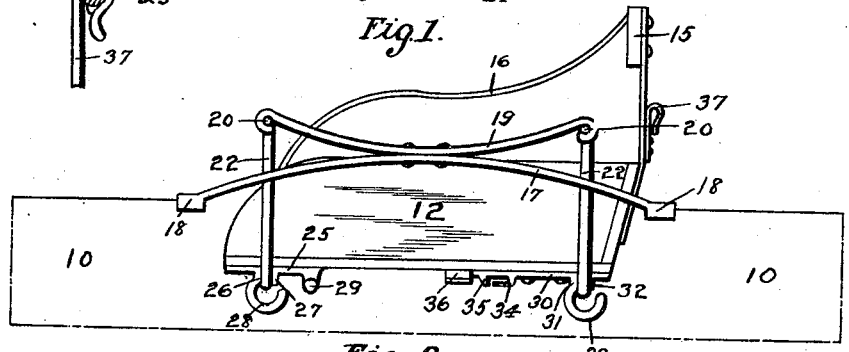
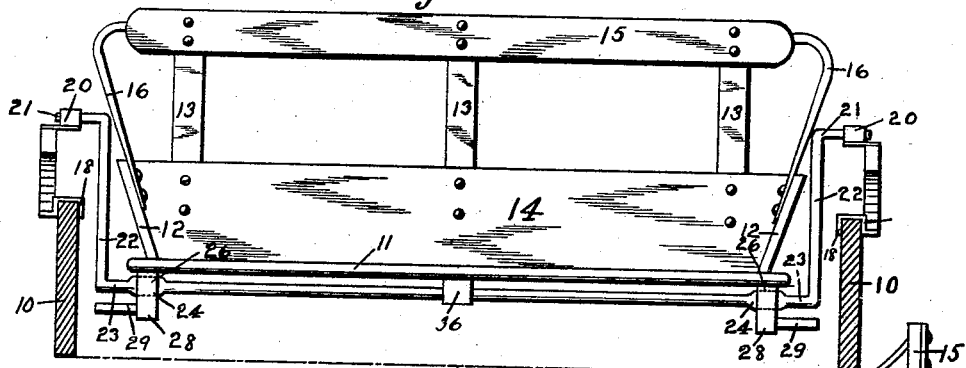
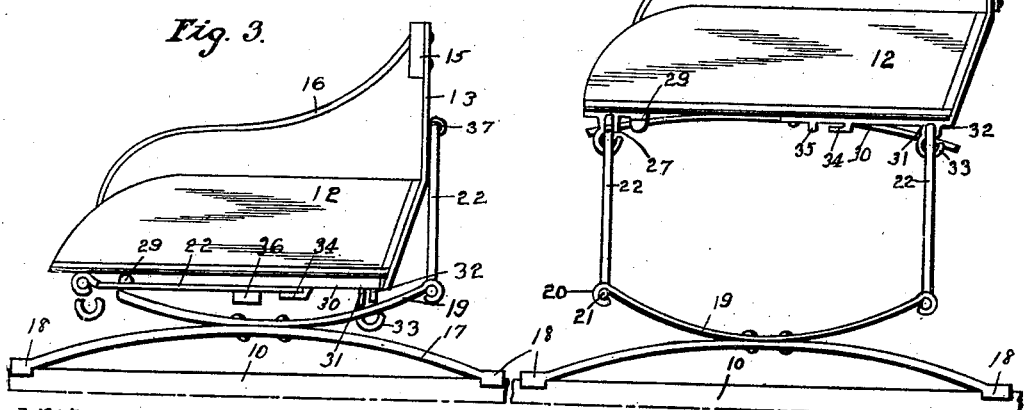
Witnesses. Inventor.

UNITED STATES PATENT OFFICE.

ALFRED CHRISTIAN ANDERSON, OF MINNEAPOLIS, MINNESOTA.

ADJUSTABLE VEHICLE-SEAT.

No. 861,347.  Specification of Letters Patent.  Patented July 30, 1907.

Application filed August 11, 1906. Serial No. 330,177.

*To all whom it may concern:*

Be it known that I, ALFRED CHRISTIAN ANDERSON, a citizen of the United States, residing at Minneapolis, Minnesota, have invented a certain new and useful Adjustable Vehicle-Seat, of which the following is a specification.

The object of my invention is to provide an adjustable seat for wagons, which is capable in one position of being supported below the top of the wagon bed, and in another position, a short distance above the top of the wagon bed, and in another position of its adjustment, at a considerable degree of elevation; whereby the seat may be adjusted to suit the requirements of the load being hauled in the wagon or the convenience and ease of the driver.

A further object is to provide a seat of this character of simple, durable and inexpensive construction, in which the various adjustments may be made without the use of tools or fastening devices and in which there are no loose parts which may be subject to loss or misplacement.

My invention consists in the construction, arrangement and combination of the various parts of the device, whereby the objects contemplated are attained as hereinafter more fully set forth, pointed out in my claims and illustrated in the accompanying drawings, in which Figure 1 shows a side elevation of a vehicle seat involving my invention, applied to a portion of a wagon bed and in its lowest position of adjustment. Fig. 2 shows a front elevation of the seat, the sides of the wagon bed being shown in section. Fig. 3 shows a view similar to Fig. 1, with the seat in its central position of adjustment. Fig. 4 shows a similar view with the seat in its highest position of adjustment. Fig. 5 shows a detail perspective view of a part of one of the seat supporting cross rods, illustrating one of the flattened portions thereof and Fig. 6 shows a detail view of one of the hooks of the seat back with one of the seat hangers and braces in position therein.

Referring to the accompanying drawings I have used the reference numeral 10 to indicate that portion shown of the wagon bed sides. The seat proper comprises a bottom 11, sides 12 and a back composed of three uprights 13, a lower cross-piece 14 and a top cross-piece 15. Braces 16 are secured to the sides 12, curved upwardly and rearwardly and attached to the upper back piece 15. The construction of the seat proper is substantially the same as those now in common use and forms no part of my invention.

The springs and seat supports at each side of the seat are identical in construction and comprise an upwardly curved spring member 17, having hooks 18 formed on its ends designed to closely fit over the top of the wagon bed side, in front and in the rear of the seat. The other spring member 19 is riveted at its central portion to the spring 17 and its end portions curve upwardly and are formed with loops 20.

The means for connecting the seat with the supporting springs and for holding it in its second position of adjustment comprises two cross-rods of similar construction, each having journals 21 on its ends inserted in the loops 20 and capable of pivotal movement therein. Each end of the rod is provided with a substantially right-angled portion 22 connecting with the straight part 23 of the cross-rod, which part extends under the bottom of the seat, and is provided near its ends with the flattened portions 24, the function of which will hereafter appear.

Supported beneath each of the forward corners of the bottom 11 is a bracket comprising a plate 25 having two downwardly projecting lugs 26 and 27 spaced apart far enough to receive the flattened portions 24 between them and to hold said flattened portions therein without permitting them to turn or to move longitudinally. The forward lug 26 has a curved guard 28 formed thereon and extended downwardly, rearwardly and then upwardly to a point spaced from the lug 27 far enough to admit the rod 23. Said guard serves the function of preventing accidental removal or displacement of the rod 23 from the lugs 26 and 27. On the rear of the plate 25 is a supporting arm 29 projecting outwardly and designed to engage and rest upon the right-angled portions 22 of the forward cross-rod when it is extended rearwardly under the seat in the position shown in Fig. 3, and when in said position, said arms 29, by engaging the parts 22, support the forward edge of the seat bottom.

On each rear corner of the seat bottom is a bracket comprising a plate 30 having thereon lugs 31 and 32, the latter provided with a curved guard 33 exactly like the corresponding parts 26, 27 and 28 on the forward plates. At the forward end of the plate 30 is a lug 34 extending downwardly and forwardly and in front of it is a stop 35, said parts being so shaped that when the forward cross-rod 23 is detached from the lugs 26 and 27 it may be inserted between the lug 34 and the stop 35 and thus the seat may be moved to position with one of the flattened portions 24 resting above the forwardly projecting part of the lug 34. The stop 35 serves to hold the part 24 in position therein. Pivoted to the under central portion of the seat bottom 11 is a spring 36 of a length substantially that of the length of the seat from front to rear, with its ends so arranged as to be capable of engaging the cross-rods, when in the position shown in Fig. 4, to prevent the accidental removal of either of them from their supporting lugs when in the said position.

On the rear faces of the outer uprights 13 are the hooks 37 arranged to receive the rear cross-piece 23 when it is projected to its upper limit as shown in Fig. 3, said hooks engaging said rod at points adjacent to the flattened portions 24, which flattened portions, by engaging the sides of the hooks, prevent longitudinal movement of the seat.

In practical use, and assuming the seat to be in the position of adjustment shown in Figs. 1 and 2, it is obvious that the rods which pass under the seat serve as hangers to support the bottom of the seat below the level of the top of the wagon bed. When in this position, fore and aft swinging of the seat is prevented by the flattened portions 24 resting between the lugs beneath the seat. The curved guards 28 serve to prevent the seat from accidental displacement from the supporting cross-rods. If it is desired to have the seat supported slightly above the top of the wagon box sides, the operator detaches the rear cross-rod from its lugs and swings it rearwardly and upwardly and places it in the hooks 37, he then detaches the front cross-rod from its lugs and swings it rearwardly and places its flattened portions 24 in engagement with the lugs 34 and the stops 35 as shown in Fig. 3, thus firmly supporting the seat with its weight carried by the springs. If it is desired to swing the seat to its elevated position, the operator disengages the cross-rods from the positions just described and swings them straight upwardly and inserts the flattened portions 24 between the lugs 26 and 27 and the lugs 31 and 32, as shown in Fig. 4, the spring 36 being placed in position with its ends pressing upwardly against the rods 23 to hold them between the lugs. Obviously all of these changes may be accomplished quickly and easily without the use of tools and there are no detachable parts liable to loss or displacement.

Having thus described my invention, what I claim and desire to secure by Letters Patent of the United States is—

1. An adjustable vehicle seat comprising a seat bottom, supports designed for connection with a vehicle bed, two crank rods pivotally connected with said supports and means for fixedly connecting the crank rods with the seat bottom when the seat rods are elevated and also for supporting the seat bottom when the seat rods project downwardly.

2. An adjustable vehicle seat comprising a seat bottom, supports designed for connection with a vehicle bed, two crank rods pivotally connected with said supports and recesses for fixedly connecting said crank rods with the seat bottom when the rods hang downwardly from their supports and also when they project upwardly.

3. An adjustable vehicle seat comprising a seat bottom, supports designed for connection with a vehicle bed, two crank rods pivotally connected with said supports and a pair of lugs at each corner of the seat and flattened portions formed on the crank rods capable of entering between the lugs of each pair.

4. An adjustable vehicle seat comprising a seat bottom, supports designed for connection with a vehicle bed, two crank rods pivotally connected with said supports and a pair of lugs at each corner of the seat and flattened portions formed on the crank rods capable of entering between the lugs of each pair, a curved guard for each pair of lugs, shaped to prevent accidental displacement of the flattened portions.

5. A vehicle seat comprising two pairs of springs each having one member formed with hooks to engage a wagon bed and the other member formed with loops or bearings, two crank rods each having its ends journaled in said loops or bearings and each provided with flattened portions, a seat bottom, a pair of lugs at each corner thereof shaped to receive the flattened portions between them either when the crank arms extend upwardly or downwardly.

6. A vehicle seat comprising a bottom portion, a back, supports to be fixed to a wagon bed, crank rods pivoted to the supports, means for fixedly connecting the crank rods with the seat bottom when the said rods are extended upwardly, hooks at the back of the seat to engage the rear crank rod when extended upwardly and lugs on the bottom of the seat to engage the forward crank rod when extended rearwardly.

7. A vehicle seat comprising a bottom portion, a back, supports to be fixed to a wagon bed, crank rods pivoted to the supports, means for fixedly connecting the crank rods with the seat bottom when the said rods are extended upwardly, hooks at the back of the seat to engage the rear crank rod when extended upwardly and lugs on the bottom of the seat to engage the forward crank rod when extended rearwardly, arms fixed to the forward portion of the seat bottom to engage and rest upon the forward crank rod when extended rearwardly.

8. An adjustable vehicle seat comprising a seat bottom, supports designed for connection with a vehicle bed, two crank rods pivotally connected with the said supports and means for fixedly connecting the crank rods with the seat bottom when the rods are elevated and also for supporting the seat bottom when the seat rods project downwardly and means for preventing accidental displacement of the crank rods.

9. A vehicle seat comprising a bottom portion, a back, supports to be fixed to a wagon bed, crank rods pivoted to the supports, means for fixedly connecting the crank rods with the seat bottom when the said rods are extended upwardly, hooks at the back of the seat to engage the rear crank when extended upwardly and lugs on the bottom of the seat to engage the forward crank rod when extended rearwardly, arms fixed to the forward portion of the seat bottom to engage and rest upon the forward crank rod when extended rearwardly, a spring under the seat to prevent accidental displacement of the forward crank rod from its recesses in the seat's middle position of adjustment.

10. An adjustable vehicle seat comprising a seat bottom, supports designed for connection with a vehicle bed, two crank rods pivotally connected with said supports and a pair of lugs at each corner of the seat and flattened portions formed on the crank rods capable of entering between the lugs of each pair, a spring pivoted to the under side of the bottom of the seat and designed to prevent the accidental displacement of the two crank rods from between the lugs.

ALFRED CHRISTIAN ANDERSON.

Witnesses:
J. R. CURRENT,
T. C. HEFFRON.